(12) United States Patent
Anstee

(10) Patent No.: US 6,678,083 B1
(45) Date of Patent: Jan. 13, 2004

(54) ELECTROCHROMIC MIRROR ASSEMBLY

(75) Inventor: Christopher John Anstee, Chichester (GB)

(73) Assignee: Schefenacker Vision Systems UK Ltd., Portchester (GB)

( * ) Notice: Subject to any disclaimer, the term of this patent is extended or adjusted under 35 U.S.C. 154(b) by 0 days.

(21) Appl. No.: 09/502,841

(22) Filed: Feb. 11, 2000

Related U.S. Application Data

(60) Provisional application No. 60/122,486, filed on Feb. 26, 1999.

(51) Int. Cl.$^7$ .............................................. G02F 1/153
(52) U.S. Cl. ...................... 359/265; 359/267; 359/273; 359/274; 359/275
(58) Field of Search ................................. 359/265–275

(56) References Cited

U.S. PATENT DOCUMENTS

| | | | | |
|---|---|---|---|---|
| 4,211,475 A | * | 7/1980 | Malugani et al. ............ | 359/270 |
| 4,465,339 A | | 8/1984 | Baucke et al. ............... | 359/274 |
| 4,896,030 A | | 1/1990 | Miyaji ......................... | 250/206 |
| 4,906,075 A | | 3/1990 | Matsumiya ................... | 359/267 |
| 4,917,477 A | | 4/1990 | Bechtel et al. ............... | 359/267 |
| 5,076,673 A | | 12/1991 | Lynam et al. ................ | 359/271 |
| 5,086,351 A | * | 2/1992 | Couput et al. ............... | 359/265 |
| 5,128,799 A | | 7/1992 | Byker ........................... | 359/265 |
| 5,148,014 A | | 9/1992 | Lynam et al. .......... | 250/214 AL |
| 5,151,824 A | | 9/1992 | O'Farrell ..................... | 359/604 |
| 5,216,536 A | | 6/1993 | Agrawal et al. ............. | 359/274 |
| 5,239,406 A | | 8/1993 | Lynam ......................... | 359/275 |
| 5,278,693 A | | 1/1994 | Theiste et al. ............... | 359/272 |
| 5,390,045 A | | 2/1995 | Bernard, Jr. .................. | 359/275 |
| 5,446,576 A | | 8/1995 | Lynam et al. ................ | 359/267 |
| 5,521,023 A | * | 5/1996 | Kejha et al. ................. | 429/142 |
| 5,581,406 A | | 12/1996 | Kobayashi et al. .......... | 359/604 |
| 5,607,485 A | * | 3/1997 | Gozdz et al. ................. | 29/623.5 |
| 5,659,423 A | | 8/1997 | Schierbeek et al. .......... | 359/604 |
| 5,668,663 A | | 9/1997 | Varaprasad et al. .......... | 359/608 |
| 5,675,438 A | | 10/1997 | Nagao et al. ................. | 359/603 |
| 5,721,646 A | | 2/1998 | Catlin et al. ................. | 359/865 |
| 5,729,379 A | * | 3/1998 | Allemand et al. ........... | 359/270 |
| 5,751,467 A | | 5/1998 | Byker .......................... | 359/272 |
| 5,801,873 A | | 9/1998 | Byker .......................... | 359/272 |
| 5,808,777 A | | 9/1998 | Lynam et al. ................ | 359/265 |
| 5,808,778 A | | 9/1998 | Bauer et al. ................. | 359/267 |
| 5,903,382 A | * | 5/1999 | Tench et al. ................. | 359/265 |
| 5,923,456 A | * | 7/1999 | Tench et al. ................. | 359/266 |
| 6,080,511 A | * | 6/2000 | Kejha .......................... | 429/300 |
| 6,111,685 A | * | 8/2000 | Tench et al. ................. | 359/267 |

FOREIGN PATENT DOCUMENTS

| | | |
|---|---|---|
| GB | 1591234 | 6/1981 |
| GB | 2296479 A | 7/1996 |
| JP | 56024322 | 3/1981 |
| JP | 56085737 | 7/1981 |
| JP | 58125017 | 7/1983 |
| JP | 10031238 | 2/1998 |
| JP | 10039345 | 2/1998 |
| JP | 9304796 | 8/1998 |
| WO | WO98/44385 | 10/1998 |

* cited by examiner

*Primary Examiner*—Evelyn Lester
(74) *Attorney, Agent, or Firm*—Warn, Burgess & Hoffman, P.C.

(57) ABSTRACT

An electrochromic mirror assembly is described that is substantially resistant to seal breaches caused by dendrite formation along adjacent layers of the laminate structure of the assembly. The laminate structure is preferably assembled in a water free environment and includes materials that prevent or inhibit the formation of dendrites between adjacent layers of the laminate structure. By way of a non-limiting example, an electrically conductive layer comprised of gold-containing material is disposed between the adhesive layer and the glass layer so as to prevent ionic migration from the reflective layer through a terminal strip.

24 Claims, 4 Drawing Sheets

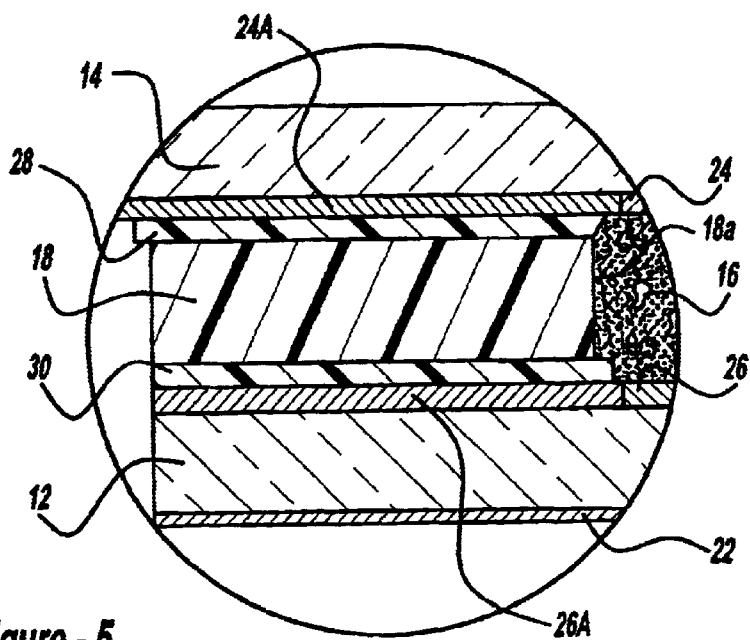
_Figure - 5_
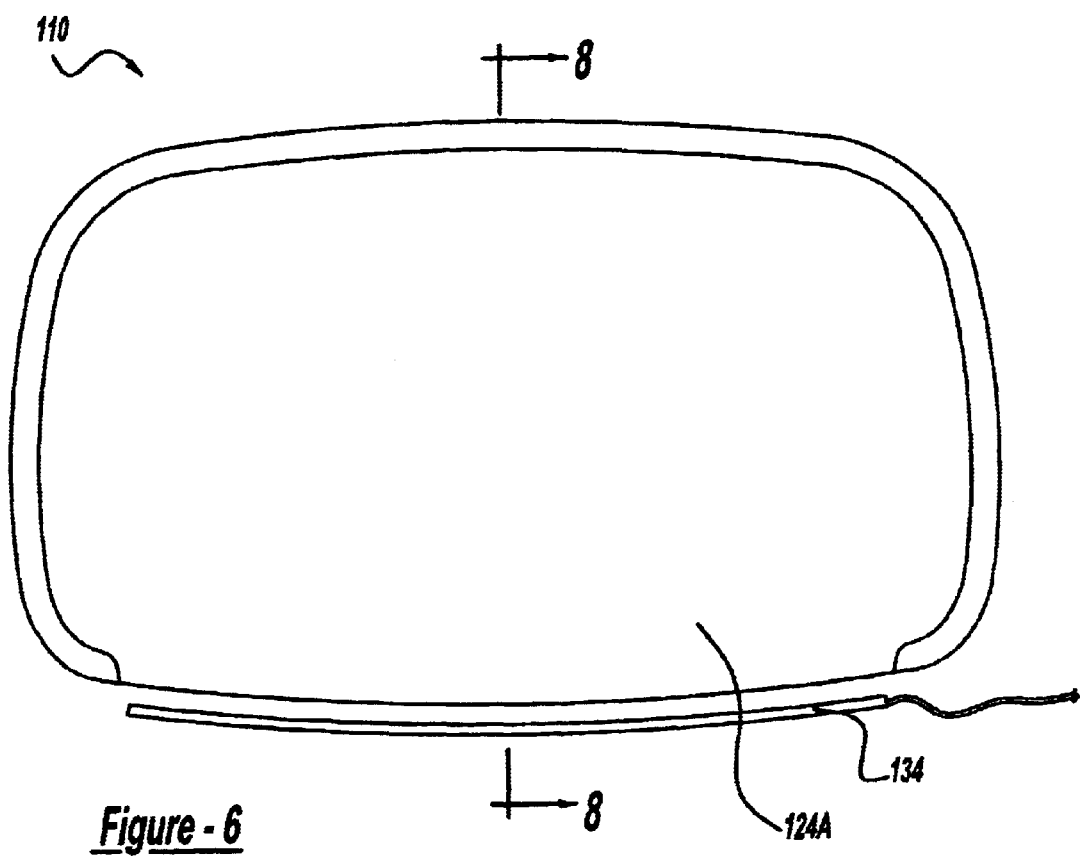
_Figure - 6_

ELECTROCHROMIC MIRROR ASSEMBLY

CROSS-REFERENCE TO RELATED APPLICATION

The instant application claims priority to U.S. Provisional Patent Application Serial No. 60/122,486, filed Feb. 26, 1999.

FIELD OF THE INVENTION

The present invention relates generally to electrochromic mirror assemblies, and more particularly to a sealed electrochromic rear view mirror assembly that is especially resistant to seal ruptures caused by dendritic formation at the electrode film/adhesive layer interface.

BACKGROUND OF THE INVENTION

Electrochromics is generally defined as the science of reversibly darkening materials by application of electricity. In recent years, electrochromic mirror assemblies have found increasing use in automotive applications, for example, for use in conjunction with rear view mirror assemblies. These electrochromic mirrors can offer properties such as automatic dimming (e.g., by mounting forward- and rearward-facing light/glare sensors on the mirror bracket) or dimming on demand by the press of a button (e.g., on a control console located in the passenger cabin). In operation, electrochromic mirror assemblies permit the reduction in the level of glare on the rear view mirror that is typically caused by the headlights of other automobiles approaching from the rear. However, while conventional electrochromic mirrors are in great demand, the failure rate is relatively high, resulting in costly recalls and assembly replacements, as well as consumer dissatisfaction.

A more complete discussion of electrochromic mirror assemblies, including their function, construction, and operation, can be found in U.S. Pat. Nos. 5,151,824; 5,446,576; 5,659,423; 5,808,778; 5,278,693; 4,917,477; 5,751,467; 5,128,299; 5,148,014; 5,668,663; 5,801,873; 4,465,339; and 5,808,778, the specifications of all of which are specifically incorporated herein by reference thereto.

For illustrative and comparative purposes, a typical construction of a conventional electrochromic mirror assembly 10 is shown generally in FIGS. 1–4, with particular reference to FIG. 3. As shown in FIGS. 1–4, the assembly is a laminate structure which typically includes a first glass panel 12, a second glass panel 14, and an electrochromic material 16 disposed or trapped therebetween. Electrochromic material 16 is trapped between the glass panels 12 and 14 by way of spacers 18 and 20. The mirror includes at least one reflective element 22 adjacent to one of the glass panels. Additionally, the construction requires conductive electrode films 24 and 26, which can be selectively energized to activate the electrochromic material 16 (e.g., in relatively high glare conditions) or deactivate it into its rest state (e.g., in relatively low glare conditions). Typically, the respective spacers 18 and 20 are sealed between glass panels 12 and 14 (more specifically, electrode films 24 and 26) by means of some type of adhesive material, shown in FIG. 3 as layers 28 and 30. Terminal strips 32 and 34 permit a current or potential to be imparted to electrochromic material 16 via conductive films 24 and 26.

It has been discovered by the present inventors that the failures in the prior art have been due to breaches in the seal between glass panels 12 and 14/electrode films 24 and 26 and adhesive layers 28 and 30. It has been discovered that dendrite formations, shown illustratively as 31 in FIG. 3, tend to migrate along the interface between electrode films 24 and 26 and adhesive layers 28 and 30 until the seal is eventually ruptured. Thereafter, air, water or other contaminants can migrate inside the laminate structure and discolor the mirror or oxidize the reflective surface 22.

It has also been discovered by the present inventors that these dendrites are probably formed due to ionic migration of silver or other materials from the reflective film 22 (which is typically comprised of silver palladium) or other conducting surfaces into the dendrite formation 31, especially through clip 34 and a suitable conductor such as water 35, as shown in FIG. 1.

Therefore, there exists a need for preventing or inhibiting dendrite formation in electrochromic mirror assemblies, especially at the interface between the adhesive layer and the electrode film layer.

SUMMARY OF THE INVENTION

It is accordingly an object of the present invention to prevent or inhibit dendritic growth in electrochromic mirror assemblies.

It is another object of the present invention to prevent or inhibit dendritic growth at the electrode film and adhesive layer interface of electrochromic mirror assemblies.

It is another object of the present invention to prevent or inhibit breaches in the seals of electrochromic mirror assemblies.

It is another object of the present invention to prevent or inhibit breaches in the seals of electrochromic mirror assemblies which can expose the electrochromic material and the interior of the mirror to outside contaminants.

In accordance with one embodiment of the present invention, an electrochromic mirror assembly comprised of a laminate structure is provided, wherein the laminate structure is substantially resistant to dendritic formation between adjacent layers of the laminate structure.

In accordance with another embodiment of the present invention, an electrochromic mirror assembly comprised of a sealed laminate structure is provided, wherein the sealed laminate structure is substantially resistant to breaches in the seals between adjacent layers of the laminate structure.

In accordance with another embodiment of the present invention, a process for manufacturing an electrochromic mirror assembly is provided, wherein the electrochromic mirror assembly comprises a sealed laminate structure, wherein the sealed laminate structure is substantially resistant to the formation of dendrites between adjacent layers of the sealed laminate structure, comprising:

selecting starting materials which are substantially free of water;

optionally, selecting starting materials which do not promote dendritic formation; and in a substantially water free environment, assembling the starting materials so as to form the sealed laminate structure.

Additional objects, advantages and features of the present invention will become apparent from the following description and appended claims, taken in conjunction with the accompanying drawings.

BRIEF DESCRIPTION OF THE DRAWINGS

The various advantages of the present invention will become apparent to one skilled in the art by reading the following specification and subjoined claims and by referencing the following drawings in which:

FIG. 5 is a detailed sectional view similar to FIG. 4, showing an alternate embodiment using gold electrodes under the spacers, in accordance with one aspect of the present invention;

FIG. 6 is an illustrative plan view of an electrochromic mirror assembly, in accordance with one aspect of the present invention;

The same reference numerals refer to the same parts throughout the various Figures.

DETAILED DESCRIPTION OF THE PREFERRED EMBODIMENTS

Figure 1:
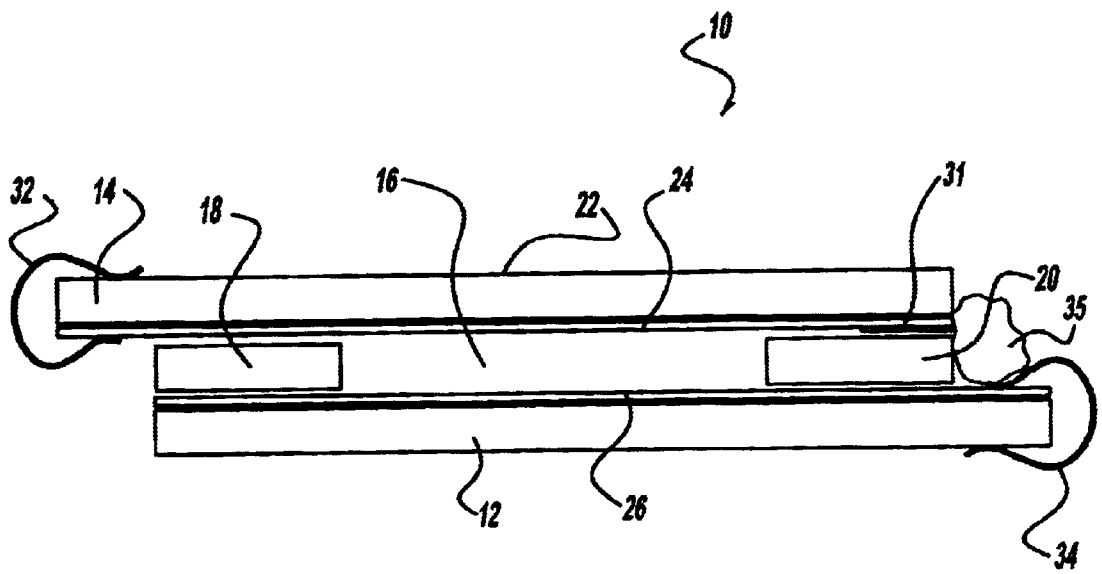
FIG. 1 is an illustrative side view of a conventional electrochromic mirror assembly.
Figure 2:
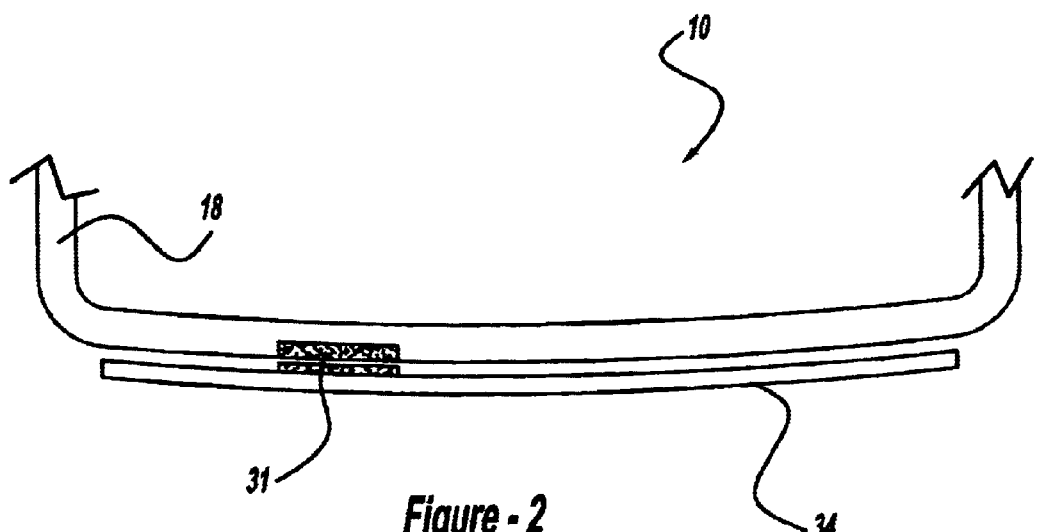
FIG. 2 is a plan view of the top of a conventional electrochromic mirror assembly, showing dendritic formations along the glass seal area.

In accordance with the general teachings of the present invention, dendritic formation, especially at the electrode film/adhesive layer interface, is prevented or inhibited by reducing or eliminating the use of silver or other common dendrite forming or promoting metals (e.g., lead or copper) in the parts, components, or systems either attached to or forming the electrochromic mirror assembly of the present invention.

For example, the conventional electrochromic mirror assembly 10 includes terminal strips (also referred to interchangeably as clips) 32 and 34 for imparting a current or potential to the electrochromic material 16 via conductive films 24 and 26. In accordance with one embodiment of the present invention, these terminal strips are preferably comprised of a non-dendrite forming material, preferably gold or gold-plated copper, or, alternatively, nickel or gold-plated nickel.

In a further embodiment of the present invention, it is preferred that the electrical wire attachment to terminal strips 32 and 34 will have facilities for crimping of the wire directly to strips 32 and 34. Alternatively, the wire could be welded onto terminal strips 32 and 34. This reduces the use of solder (i.e., for attaching the wire) which typically also contains dendrite forming or promoting materials. Additionally, prior art soldered connections were rather weak and were subject to failure in conventional electrochromic mirror assemblies. Such crimped or welded connections will be particularly advantageous when gold or gold-plated terminal strips are used which are not easily soldered.

Alternatively, reflective layer 22 could be made of a material (other than palladium silver) which is resistant to dendrite formation, such as a gold-based or chromium-based reflective materials.

Figure 3:
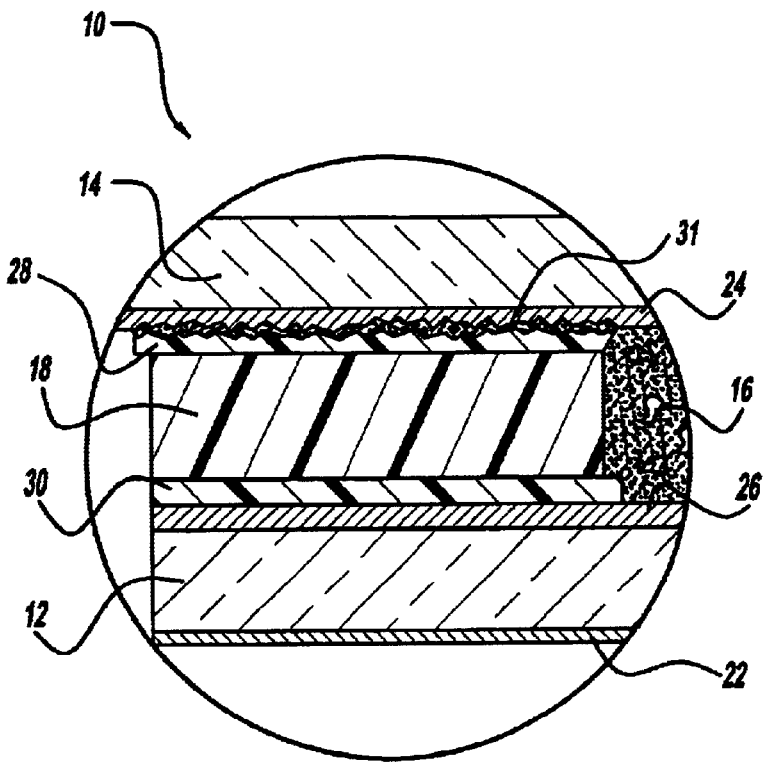
FIG. 3 is a detailed sectional view of a portion of the conventional electrochromic mirror assembly shown in FIG. 1 showing dendrite formation.
Figure 4:
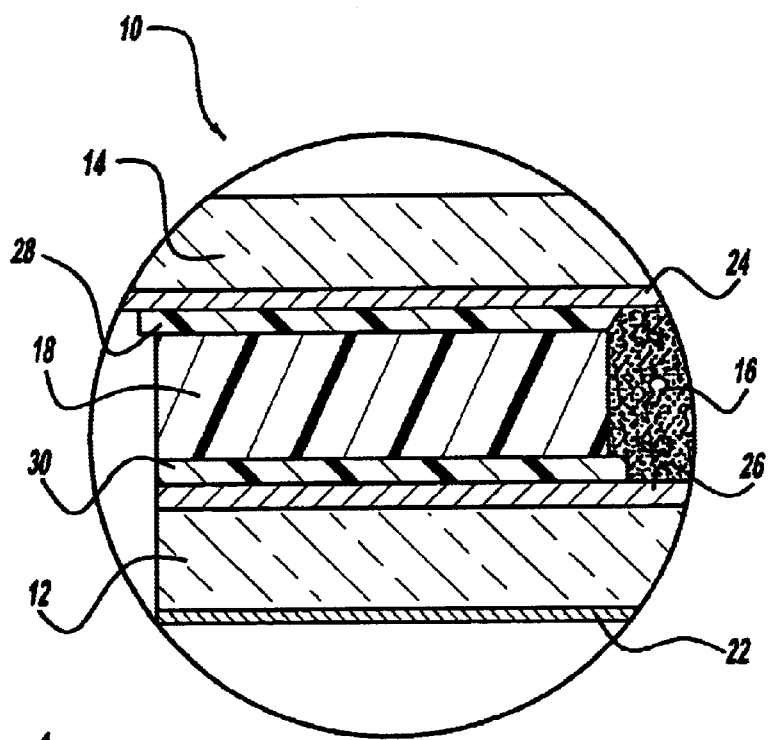
FIG. 4 is a detailed sectional view of a portion of the conventional electrochromic mirror assembly set forth in FIG. 1, showing a sealed configuration.

In an alternative embodiment in the construction of FIG. 3, gold electrode edges could be provided, which would be electrically attached to the conductive films 24 and 26, but which would extend underneath adhesive layers 28 and 30 to the outside edge for connection to terminal strips 32 and 34. As shown in FIG. 5, gold electrodes 24A and 26A could be placed underneath adhesive layers 28 and 30 to prevent or inhibit the formation and/or migration of dendrites.

In yet another alternative embodiment, the gold electrodes 24A and 26A would, instead of wrapping around the periphery of the glass surfaces, be provided only at necessary locations, thus to minimize possible dendritic growth along these surfaces (see FIGS. 6 through 9 and the description below). At all other locations, electrode films 24 and 26 would terminate prior to the inside edge 18A of spacer 18.

Referring now to FIGS. 6 through 9, there is a further embodiment, wherein like numerals differing by 100 refer to like elements as those in FIGS. 1 through 4. In this embodiment, the electrode film layers 124 and 126 are terminated and pre-sized against the spacers 118 or 120, respectively. It is to be appreciated that while reflective surface 122 is shown in its present position, it could alternatively be set forth on the inside face of the glass at a position adjacent to the electrode layer shown in FIG. 6.

Figure 7:
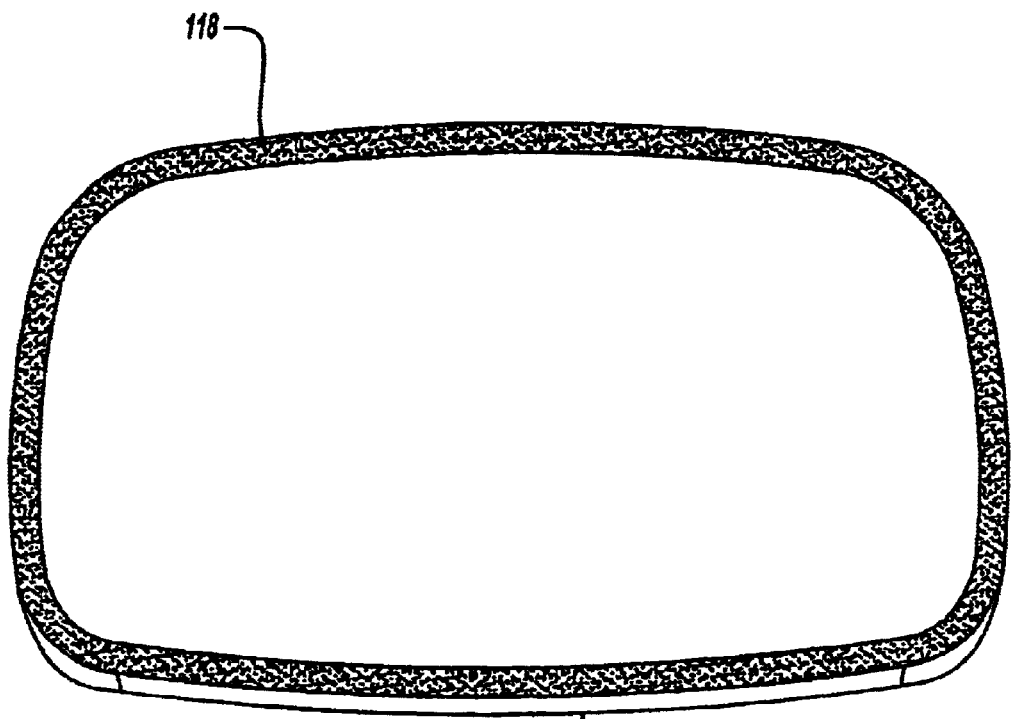
FIG. 7 is a sectional view of the electrochromic mirror assembly shown in FIG. 6, in accordance with one aspect of the present invention.

As shown in section 8—8, the embodiment in this instance has an area of conductive coating isolated from the edges of the mirror, with only one side which extends out to the end of the glass for being attached to the clip 134. On the other side of the glass, this pattern is reversed so that the edge 126A is connected to the clip 132 on the second side of the mirror assembly adjacent clip 132. Other than this, the remaining sides are again insulated from the edge of the mirror assembly by the spacer. Thus, as best shown in FIG. 7, the ends of the conductive material are terminated on the inside of the spacer 118A and 120A. Thus, the actual positive and negative electrodes for the connections 132 and 134 are diametrically opposed and on opposite sides of the mirror assembly. This substantially reduces the propensity of the dendritic formations, in that dendritic migration would have to occur over the entire expanse of the width of the mirror.

Figure 8:
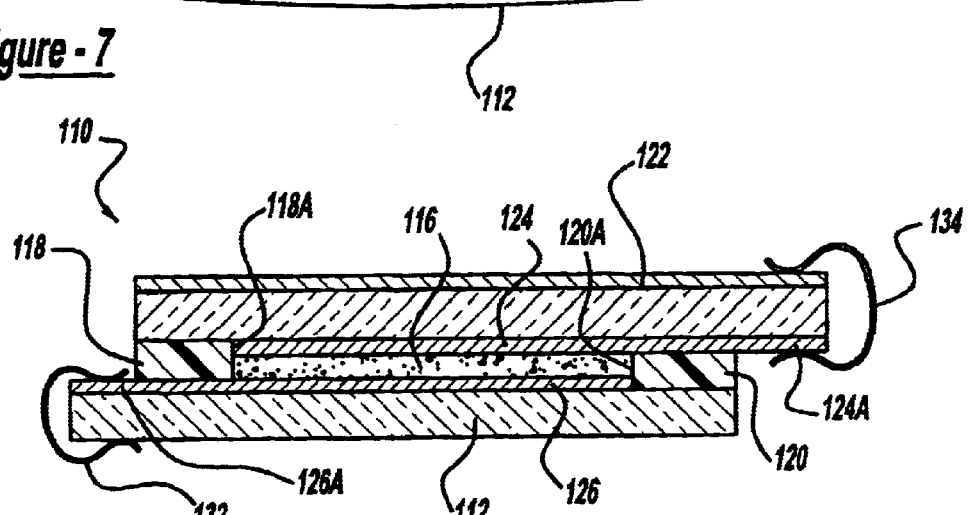
FIG. 8 is a sectional view taken along line 8—8 of FIG. 6, in accordance with one aspect of the present invention.
Figure 9:
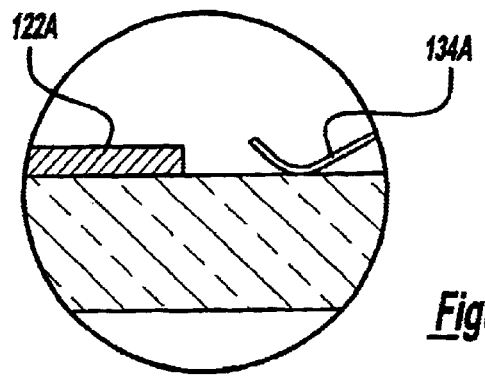
FIG. 9 is an alternate embodiment of FIG. 8, wherein the terminal clip is prevented from touching the reflective surface, in accordance with one aspect of the present invention.

As shown in FIG. 8, there is yet an alternate embodiment wherein the clip 134A is separated from the reflective surface 122A to reduce the possibility of ionic migration through the clip to the layer between the adhesive and the conductive surface 124A. Of course it would be recognized by one skilled in the art that other ways of insulating the reflective surface from the conductive layers 124 and 126 may be utilized. However, it should be noted that even if the conductor 134 is insulated against contact with the reflective surface 122, it requires sufficient insulation to stop dendritic formation. Thus, the space between clip 134A and the edge of mirror surface 122A should be at least 1 mm, and preferably 7 mm or greater.

Alternatively, adhesives which prevent dendrite formation could be utilized in the present invention.

Manufacturing processes which eliminate incorporation of water into the laminate will also help to reduce the chances of formation of dendrites. Thus, in accordance with the process aspects of the present invention, the individual components of the laminate are dried prior to assembly. Thereafter, the laminates are assembled under controlled conditions substantially in the absence of water. Adhesives and other components are selected which are water free. This creates a laminate that inherently resists dendrite breaching of the sealed unit, unlike prior art designs where no such manufacturing process is used.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An electrochromic mirror assembly comprised of:
   a laminate structure;
   wherein the laminate structure is substantially resistant to dendritic formation between adjacent layers of the laminate structure;
   wherein the laminate structure includes:
      first and second glass layers;
      an electrochromic material layer disposed between the first and second glass layers;
      a reflective layer adjacent to either of the first and second glass layers;
      at least one spacer element disposed between the first and second glass layers, whereby the at least one spacer element prevents migration of the electrochromic material layer;
      at least one electrically conductive layer disposed between the first and second glass layers; and
      at least one adhesive layer;
      wherein the at least one spacer element is disposed between the at least one adhesive layer and the at least one electrically conductive layer;
      wherein the at least one adhesive layer does not abut the at least one electrically conductive layer.

2. The invention according to claim 1, wherein the laminate structure further includes at least one other electrically conductive layer, wherein the at least one other electrically conductive layer is disposed between the at least one adhesive layer and at least one of the first and second glass layers, wherein at least one surface of the at least one electrically conductive layer abuts at least one surface of the at least one other electrically conductive layer.

3. The invention according to claim 2, wherein the at least one other electrically conductive layer is comprised of materials selected from the group consisting of gold, copper, nickel and combinations thereof.

4. The invention according to claim 2, wherein the laminate structure further includes at least one electrically conductive member, wherein the at least one electrically conductive member is in contact with at least one of the following: the first and second glass layers, the reflective layer, and the at least one other electrically conductive layer.

5. The invention according to claim 4, wherein the reflective layer, the at least one adhesive layer, the at least one other electrically conductive layer, and the at least one electrically conductive member are comprised of materials which do not promote dendritic formation.

6. The invention according to claim 1, wherein the laminate structure is substantially water free.

7. An electrochromic mirror assembly comprised of:
   a sealed laminate structure;
   wherein the sealed laminate structure is substantially resistant to breaches in the seals between adjacent layers of the laminate structure;
   wherein the sealed laminate structure includes:
      first and second glass layers;
      an electrochromic material layer disposed between the first and second glass layers;
      a reflective layer adjacent to either of the first and second glass layers;
      at least one spacer element disposed between the first and second glass layers, whereby the at least one spacer element prevents migration of the electrochromic material layer;
      at least one electrically conductive layer disposed between the first and second glass layers; and
      at least one adhesive layer;
      wherein the at least one spacer element is disposed between the at least one adhesive layer and the at least one electrically conductive layer;
      wherein the at least one adhesive layer does not abut the at least one electrically conductive layer.

8. The invention according to claim 7, wherein the sealed laminate structure further includes at least one other electrically conductive layer, wherein the at least one other electrically conductive layer is disposed between the at least one adhesive layer and at least one of the first and second glass layers, wherein at least one surface of the at least one electrically conductive layer abuts at least one surface of the at least one other electrically conductive layer.

9. The invention according to claim 7, wherein the at least one other electrically conductive layer is comprised of materials selected from the group consisting of gold, copper, nickel and combinations thereof.

10. The invention according to claim 7, wherein the sealed laminate structure further includes at least one electrically conductive member, wherein the at least one electrically conductive member is in contact with at least one of the following: the first and second glass layers, the reflective layer, and the at least one other electrically conductive layer.

11. The invention according to claim 10, wherein the reflective layer, the at least one adhesive layer, the at least one other electrically conductive layer, and the at least one electrically conductive member are comprised of materials which do not promote dendritic formation.

12. The invention according to claim 7, wherein the sealed laminate structure is substantially water free.

13. An electrochromic mirror assembly comprised of:
   a laminate structure substantially resistant to dendritic formation between adjacent layers of the laminate structure, wherein the laminate structure comprises:
      at least one adhesive layer;
      a spacer element adjacent to the at least one adhesive layer;
      a first electrically conductive layer adjacent to the adhesive layer, wherein the at least one adhesive layer is disposed between the spacer element and the first electrically conductive layer; and
      a second electrically conductive layer adjacent to the first electrically conductive layer, wherein the at least one adhesive layer does not abut the second electrically conductive layer, wherein the first electrically conductive layer is comprised of materials that do not promote dendritic formation.

14. The invention according to claim 13, further comprising at least one glass layer adjacent to either the first or second electrically conductive layers.

15. The invention according to claim 13, further comprising an electrochromic material layer adjacent to either the first or second electrically conductive layers.

16. The invention according to claim 13, further comprising a reflective layer adjacent to the at least one glass layer.

17. An electrochromic mirror assembly comprised of:
a laminate structure substantially resistant to dendritic formation between adjacent layers of the laminate structure, wherein the laminate structure comprises:
first and second spaced and opposed adhesive layers;
a spacer element disposed between the first and second adhesive layers;
a first electrically conductive layer adjacent to either the first or second adhesive layers, wherein either the first or second adhesive layers is disposed between the spacer element and the first electrically conductive layer; and
a second electrically conductive layer adjacent to the first electrically conductive layer, wherein neither the first or second adhesive layers abut the second electrically conductive layer, wherein the first electrically conductive layer is comprised of materials that do not promote dendritic formation.

18. The invention according to claim 17, further comprising at least one glass layer adjacent to either the first or second electrically conductive layers.

19. The invention according to claim 17, further comprising an electrochromic material layer adjacent to either the first or second electrically conductive layers.

20. The invention according to claim 17, further comprising a reflective layer adjacent to the at least one glass layer.

21. An electrochromic mirror assembly comprised of:
a laminate structure substantially resistant to dendritic formation between adjacent layers of the laminate structure, wherein the laminate structure comprises:
first and second spaced and opposed adhesive layers;
a spacer element disposed between the first and second adhesive layers;
first and second spaced and opposed electrically conductive layers adjacent to the first and second adhesive layers, wherein the first and second adhesive layers are disposed between the first and second electrically conductive layers; and
third and fourth electrically conductive layers adjacent to the first and second electrically conductive layers, wherein neither the first or second adhesive layers abut the third and fourth electrically conductive layers, wherein the first and second electrically conductive layers are comprised of materials that do not promote dendritic formation.

22. The invention according to claim 21, further comprising at least one glass layer adjacent to either the first or second electrically conductive layers.

23. The invention according to claim 21, further comprising an electrochromic material layer adjacent to either the first or second electrically conductive layers.

24. The invention according to claim 21, further comprising a reflective layer adjacent to the at least one glass layer.

* * * * *